Oct. 2, 1956
D. H. BOND
2,765,000
PIPE SPACING DEVICE
Filed Dec. 3, 1952
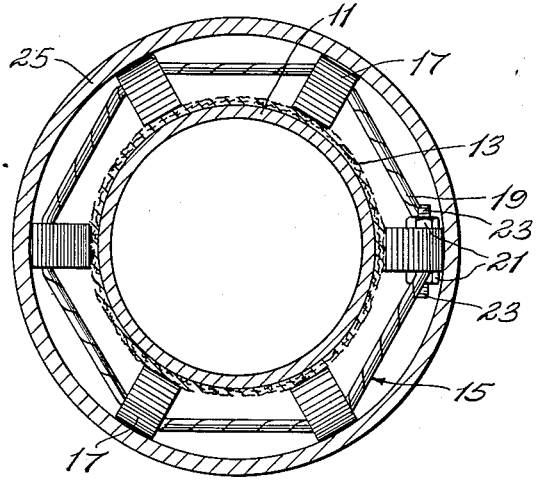
Fig.1.
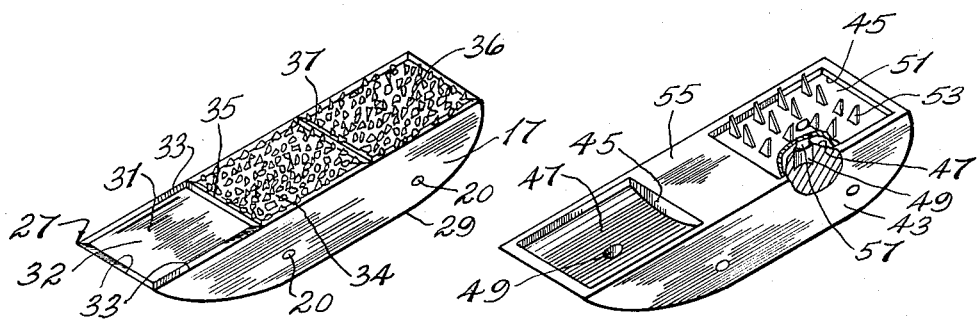
Fig.2.   Fig.3.
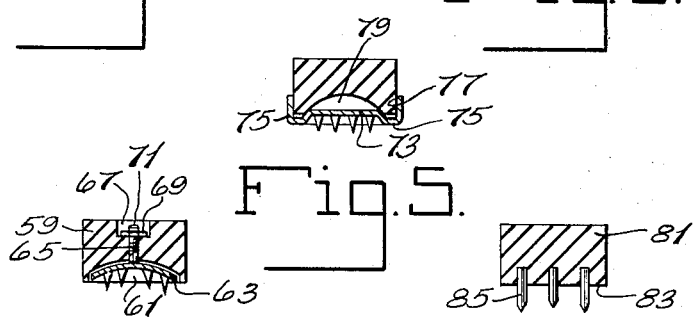
Fig.5.
Fig.4.   Fig.6.
INVENTOR.
DONALD H. BOND
BY
*J. H. Graham*
ATTORNEY United States Patent Office 2,765,000
Patented Oct. 2, 1956

2,765,000

PIPE SPACING DEVICE

Donald H. Bond, Houston, Tex., assignor, by mesne assignments, to The Texas Pipe Line Company, Houston, Tex., a corporation of Texas Application December 3, 1952, Serial No. 323,904

12 Claims. (Cl. 138—65)

The present invention relates to a novel pipe spacing device of the type which is fastened around an inner pipe to space the inner pipe from an outer casing.

Such devices often are used in the construction of pipe lines for oil or gas wherein an inner fluid-conducting pipe is placed within an outer casing, and the pipe is electrically insulated from the casing to reduce electrolytic corrosion. They may comprise a series of long narrow blocks of electrically insulating material which are placed at spaced intervals around the pipe circumference and secured together by one or more tensioned rods, cables or similar connectors.

My invention constitutes an improvement upon the device described and claimed in my U. S. Patent Re. 23,545. Reference is also made to my co-pending U. S. application, Serial No. 287,998, filed May 15, 1952, for "Concentric Pipe Insulator and Spacer."

By employing the pipe spacing devices described in the aforementioned patent and application the rate of corrosion is greatly reduced. Also there is a reduced power requirement when cathodic protection is applied to the pipe line.

I have found that the pipe spacing devices previously available have not been completely satisfactory when they are applied to a pipe line wherein the outside of the fluid-conducting pipe carries a protective surface coating of the relatively soft grease-type. Difficulty is experienced because the coating extrudes out from under the spacer members when they are applied to the pipe, and because the lubricity of the coating causes the spacer members to slip along the pipe when it is being installed within the casing. Further difficulty is encountered when the soft grease-type coating is covered with an outer wrapping of paper or paper felt because the spacer members cannot then penetrate the paper and be tightly and permanently secured in position.

In accordance with the present invention there is provided a novel pipe spacing device which overcomes the disadvantages described above. A plurality of annularly disposed spacer members, which are spaced circumferentially from one another and secured together in accordance with my patent, are provided with an inner pipe-engaging surface having a recessed portion adapted to receive the soft pipe coating. Preferably the recess comprises a major part of the inner surface and is bounded by sharp narrow edges adapted to penetrate easily through any soft coating material on the pipe to engage the pipe surface. When such a spacer member is employed, the grease like coating on the pipe is not extruded out from under the member, but enters the recessed portion and remains there to protect the pipe.

Still further in accordance with the invention, a spacer member can be provided with friction-producing means to hold it firmly in place on the pipe as the latter is inserted into a casing, without the slippage formerly encountered. Such friction producing means may be metallic or non-metallic fragments or members located within the recessed portion of the spacer member; or such members even may be employed with a spacer member having no recess. When the pipe is wrapped with paper or the like on top of the soft coating it is desirable that the friction producing members have sharp points to penetrate through the paper, and that they be long enough to extend through the paper and the coating to the pipe surface.

The principles of the invention may be applied to pipe spacing devices of any desired composition, whether or not electrical insulation is desired. However, in most instances the spacer members should be constructed of an electrically insulating material such as a phenolic resin, hard rubber, or similar material having a high di-electric and mechanical strength and low moisture absorption properties.

The principles of the invention will be described more in detail below, with reference to the accompanying drawings wherein:

Fig. 1 is a cross-sectional view, parts being shown in elevation, through a typical pipe line wherein an inner pipe is spaced within an outer casing in accordance with the invention;

Fig. 2 is a perspective view showing a pipe spacer member embodying the invention;

Fig. 3 is a perspective view showing a pipe spacer member embodying another form of the invention; and Figs. 4, 5, and 6 are cross-sectional views taken through pipe spacer members embodying three other modifications of the invention.

Referring to Fig. 1 of the drawings, an inner pipe 11 having a soft grease-like protective coating 13 on its outside surface carries a pipe spacing device 15 comprising a plurality of annularly disposed circumferentially separated spacer members 17 which are secured together in series around the pipe by connector means such as a pair of longitudinally spaced tensioned cables 19 (only one shown) which pass through spaced transverse holes (see 20 in Fig. 2) in the spacer members and are secured tightly at their opposite ends to one of the spacer members by means of nuts 21 threaded on stud or bolt members 23 at the ends of the cables. The cables 19 are tensioned sufficiently that the spacer members 17 are embedded within the soft coating 13 and held tightly against the inner pipe 11.

The pipe 11 carrying the spacing device 15 is positioned within the outer casing 25 in spaced relation thereto and is insulated therefrom by the several spacer members 17, so that corrosion is greatly retarded by the elimination of electrolytic action between the pipe and the casing. Positioning is generally accomplished by sliding the pipe 11 into casing 25, using the spacer members 17 as skids or runners.

Fig. 2 shows one type of spacer member 17, comprising a long narrow block of electrically insulating material having an inner surface 27 which is adapted to engage a pipe, and having an opposite outer surface 29 which tapers at its ends to ease the passage of the pipe within the casing.

The inner surface 27 comprises a recessed portion 31 which is adapted to entrap, instead of displacing, the soft coating material when the spacer member is tensioned against the pipe. Desirably the recessed portion 31 comprises a major part of the inner surface of the block, and is bounded by sharp narrow edges 33 which penetrate easily through the soft material without causing it to extrude away. As shown in Fig. 2 the recessed portion 31 is divided into three separate areas 32, 34, and 36 separated by a pair of sharp edges 35 and 37 which bear against the pipe to reduce slippage. It is evident, however, that more or less than two such separating edges can be employed.

While the construction described in the preceding paragraph satisfactorily solves the problem of preventing extrusion of the soft coating material from under the spacer member, there may sometimes be a tendency for the spacer members 17 to slide along or around the pipe due to the lubricity of the soft coating. I overcome this problem by inserting in recess 31 friction producing members which project slightly beyond the level of the inner surface 27 and engage the surface of the pipe to hold the spacer member firmly in position. Such friction producing members can be individual coarse fragments of hard high-friction material such as silicon carbide, granite, quartz, or the like, which have outer configurations of suitable sharpness, and which have been screened to a suitable size to assure projection beyond the level of the inner surface. For example, a recess one quarter inch deep requires fragments having an average diameter slightly greater than one quarter inch. Such fragments are held in place within the recess 31 by any suitable adhesive such as glue, a liquid cement, or a thermo-setting resin which is applied within the recess to a depth sufficient to prevent a tendency of the individual fragments to roll when any lateral force is applied to the spacer member. Sufficient space must be left between the fragments to receive the soft coating material.

The spacer member 17, as well as the other modifications to be described, is provided with suitable means for engaging a connector to couple the spacer member into a series of similar members making up the spacing device 15. As shown in Fig. 2 this means may comprise a pair of longitudinally spaced holes 20 passing transversely through the spacer member 17 to receive the cables 19.

In the modification shown in Fig. 3 a block 43, having a shape similar to that described in connection with Fig. 2, is provided with a pair of longitudinally spaced recesses 45 having cylindrically concave bottom walls 47 in which are located holes 49 extending at least part way through the thickness of the block. Each of the recesses 45 receives a flat plate 51 of metal such as steel which rests on the sides of the concavity 47 below the level of surface 55, and has a plurality of sharp hard triangular points 53 which project from the plate to a position beyond the level of the inner surface 55 so as to penetrate through any paper wrapping and the soft coating to the surface of a pipe. Other gripping elements may be used, such as sharpened calks, spikes, serrations, or the like, which may be attached to the plate by bradding or welding, or formed integrally by casting or forging. A series of individual spikes also may be fitted in the bottom of concavity 47. Coating material which extrudes through the punctures in the paper enters the recess 45.

The plate 51 is secured within its recess 45, before application of the block 43 to the pipe, by a stud 57 which projects from the center of the plate into the hole 49. Stud 57 can be sized to fit snuggly within the hole, or suitable glue or other adhesive retaining material can be introduced into the hole to engage the stud. Stud 57 may have a rough surface to facilitate its engagement in the hole. The plate 51 and points 53 may be suitably painted to promote bonding of the pipe coating thereto, and may additionally be coated with a suitable corrosion preventive material such as asphalt or tar products.

When pressure is exerted to urge block 43 into contact with the pipe the force on points 53 causes the plate 51 to bend into the concavity 47 so that the points all will bear against the curved pipe surface.

In the modification shown in Fig. 4 a block 59 is provided with a concave bottomed recess 61 similar to that of Fig. 3 and a similar point-bearing plate 63 is located in the recess. In block 59, however, there are holes 65 which extend completely through the block and are counterbored at their outer ends 67 to receive a retaining nut 69 which is threaded over a stud 71 to retain the plate in position, and even to exert sufficient tension on the plate to bow it to shape when desired.

The modification shown in Fig. 5 is similar to Figs. 3 and 4 except that the lateral edges 75 of the plate 73 extend up and around the boundary edges 77 of the recess 79 and are crimped tightly to the edges to hold the plate in position.

In Fig. 6 there is shown a spacer member 81 which is not provided with a recess to receive the soft grease-like coating, but which instead has a flat inner surface 83 from which protrude a series of sharp pointed prongs 85 to penetrate through paper and coating and bear against the outer surface of the pipe. Advantageously the points of prongs 85 lie on the circumference of a circle similar to the pipe surface, and the prongs are long enough to avoid displacement of the coating.

The designs and methods of attachment for the protruding gripping elements are all such that when the spacer members are installed on a pipe line having a soft coating, the gripping elements are imbedded in and covered by the coating material. Such an arrangement protects the gripping elements from corrosion which may be caused by soil waters, or electrolytic action between the elements and the pipe.

The concave recesses and the bendable plates with protruding prongs are provided so that all of the prongs serve to carry the pipe load equally. In addition the design provides for the automatic fitting of the prongs to the curvature of any pipe wall. Thus only one size of gripping plate is necessary to fit a wide range of pipe sizes.

Obviously, many modifications and variations of the invention as hereinbefore set forth may be made without departing from the spirit and scope thereof, and therefore only such limitations should be imposed as are indicated in the appended claims.

I claim:

1. A pipe spacing device adapted to be secured on the outside of a pipe, comprising a plurality of annularly disposed spacer members separated circumferentially from one another, said spacer members having an inner surface adapted to engage such a pipe, said inner surface including a recessed portion for receiving any soft coating material on such a pipe said recessed portion containing friction producing members projecting therefrom to engage the surface of such a pipe, said members occupying only a part of said recessed portion whereby space is left for receiving soft pipe coating material; said spacer members having means for engaging connecting means; and means connecting together said spacer members so constructed and arranged as to hold said spacer members tightly in place on such a pipe.

2. A pipe spacing device adapted to be secured on the outside of a pipe, comprising a plurality of annularly disposed spacer members separated circumferentially from one another, said spacer members having an inner surface adapted to engage such a pipe, said inner surface including a recessed portion for receiving any soft coating material on such a pipe, said recessed portion containing friction producing members projecting therefrom to engage the surface of such a pipe, said friction producing members being individual fragments of hard material bonded to said spacer members; and means connecting together said spacer members so constructed and arranged as to hold said spacer members tightly in place on such a pipe.

3. A pipe spacing device adapted to be secured on the outside of a pipe, comprising a plurality of annularly disposed spacer members separated circumferentially from one another, said spacer members having an inner surface adapted to engage such a pipe, said inner surface including a recessed portion for receiving any soft coating material on such a pipe; said pipe spacing device also comprising a metal plate within said recessed portion having a plurality of points projecting from said recessed portion to engage the surface of such a pipe; and means connecting together said spacer members so constructed and arranged as to hold said spacer members tightly in place on such a pipe.

4. A pipe spacing device in accordance with claim 3 wherein the bottom of said recessed portion is concave and said metal plate is flat and bridges said concave bottom, whereby said metal plate is forced into said concave bottom when pressure is applied to said points during application of said device to a pipe.

5. A pipe spacing device adapted to be secured on the outside of a pipe, comprising a plurality of annularly disposed spacer members separated circumferentially from one another, said spacer members having an inner surface adapted to engage such a pipe, said inner surface including a recessed portion for receiving any soft coating material on such a pipe; said pipe spacing device also comprising a metal plate within said recessed portion having a plurality of points projecting from said recessed portion to engage the surface of such a pipe, said spacer members having a hole extending from the bottom of said recessed portion, and said metal plate having a stud secured in said hole; and means connecting together said spacer members so constructed and arranged as to hold said spacer members tightly in place on such a pipe.

6. A spacer member for a pipe spacing device adapted to be secured on the outside of a pipe, said spacer member comprising a block of electrically insulating material having a surface adapted to engage a pipe, said surface including a recessed portion for receiving any soft coating material on such a pipe, said recessed portion containing friction producing members projecting therefrom to engage the surface of such a pipe, said members occupying only a part of said recessed portion whereby space is left for receiving soft pipe coating material, said block also having means for engaging a connecting member to couple said block to a series of similar blocks.

7. A spacer member in accordance with claim 6 wherein said friction producing members are individual fragments of hard material bonded to said block.

8. A spacer member for a pipe spacing device adapted to be secured on the outside of a pipe, said spacer member comprising a block of electrically insulating material having a surface adapted to engage a pipe, said surface including a recessed portion for receiving any soft coating material on such a pipe, said spacer member also comprising a metal plate within said recessed portion having a plurality of points projecting from said recessed portion to engage the surface of such a pipe, said block also having means for engaging a connecting member to couple said block to a series of similar blocks.

9. A spacer member in accordance with claim 8 wherein the bottom of said recessed portion is concave, and said metal plate is flat and bridges said concave bottom, whereby said metal plate is forced into said concave bottom when pressure is applied to said points during application of said device to a pipe.

10. A spacer member for a pipe spacing device adapted to be secured on the outside of a pipe, said spacer member comprising a block of electrically insulating material having a surface adapted to engage a pipe, said surface including a recessed portion for receiving any soft coating material on such a pipe, said spacer member also comprising a metal plate within said recessed portion having a plurality of points projecting from said recessed portion to engage the surface of such a pipe, said block having a hole extending from the bottom of said recessed portion, and said metal plate having a stud secured in said hole, said block also having means for engaging a connecting member to couple said block to a series of similar blocks.

11. A spacer member for a pipe spacing device adapted to be secured on the outside of a pipe, said spacer member comprising a block of electrically insulating material having a surface adapted to engage a pipe, said surface including a recessed portion for receiving any soft coating material on such a pipe, said spacer member also comprising a metal plate within said recessed portion having a plurality of points projecting from said recessed portion to engage the surface of such a pipe, said plate having lateral edges crimped over boundary edges of said recessed portion to retain said plate therein, said block also having means for engaging a connecting member to couple said block to a series of similar blocks.

12. A pipe spacing device adapted to be secured on the outside of a pipe, comprising a plurality of annularly disposed spacer members separated circumferentially from one another, said spacer members having an inner surface adapted to engage such a pipe, said inner surface including a recessed portion for receiving any soft coating material on such a pipe; said spacer member also comprising a metal plate within said recessed portion having a plurality of points projecting from said recessed portion to engage the surface of such a pipe, said plate having lateral edges crimped over boundary edges of said recessed portion to retain said plate therein; and means connecting together said spacer member so constructed and arranged as to hold said spacer members tightly in place on such a pipe.

References Cited in the file of this patent

UNITED STATES PATENTS

| | | |
|---|---|---|
| Re. 23,545 | Bond | Sept. 9, 1952 |
| 412,199 | McIlhenny | Oct. 1, 1889 |
| 1,594,364 | Gottwald | Aug. 3, 1926 |
| 2,100,001 | Eberle | Nov. 23, 1937 |
| 2,416,063 | Nicholls | Feb. 18, 1947 |
| 2,520,448 | Abegg | Aug. 29, 1950 |
| 2,618,450 | Thomas | Nov. 18, 1952 |

FOREIGN PATENTS

| | | |
|---|---|---|
| 584,845 | Great Britain | Jan. 23, 1947 |